W. A. CARTE.
COTTON AND SUGAR BEET CHOPPER.
APPLICATION FILED FEB. 21, 1916.
1,283,664.
Patented Nov. 5, 1918.
8 SHEETS—SHEET 3.
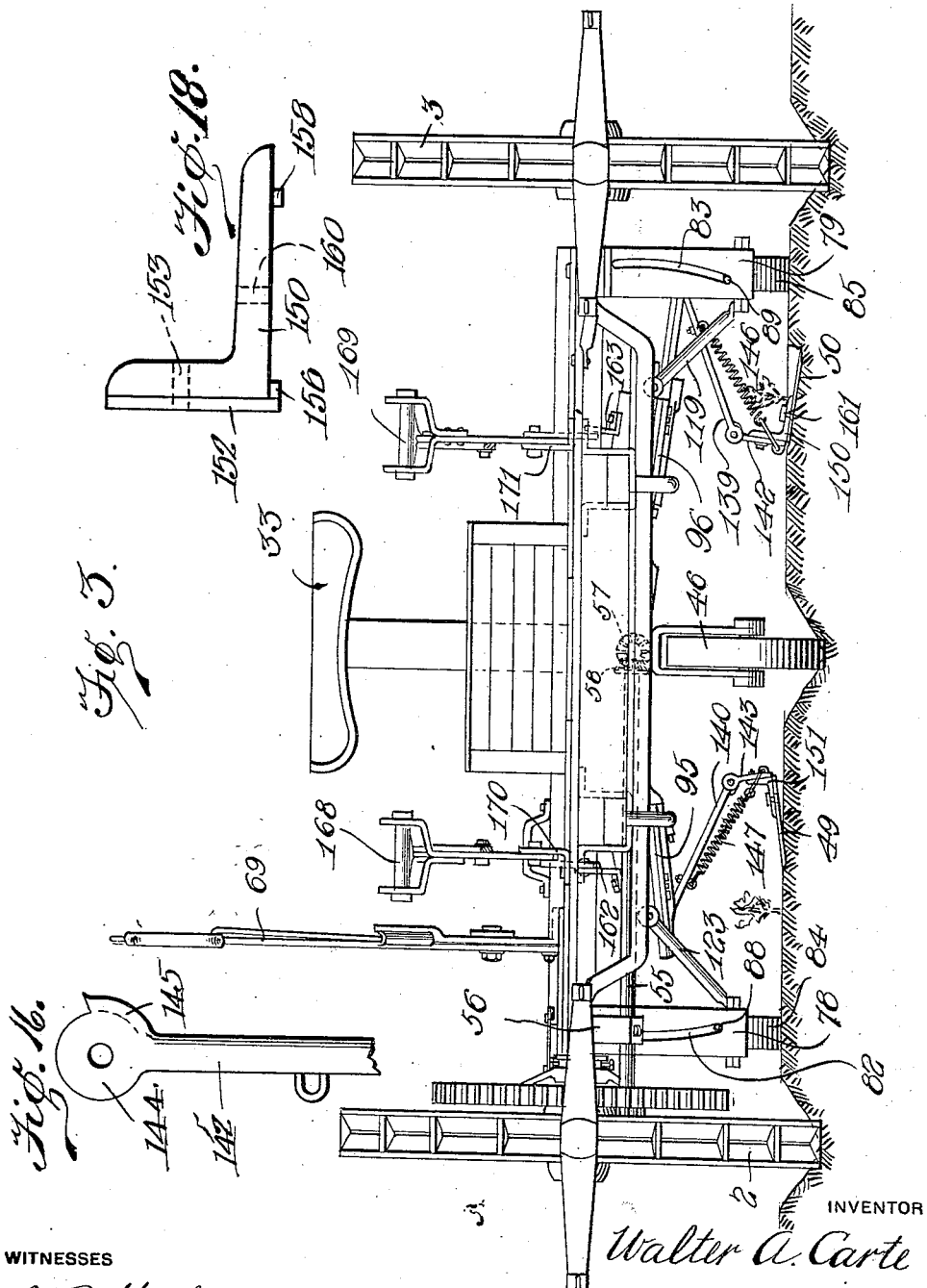
WITNESSES
C. P. Hardy
Lloyd W. Patch
INVENTOR
Walter A. Carte
BY Richard Owen,
ATTORNEY

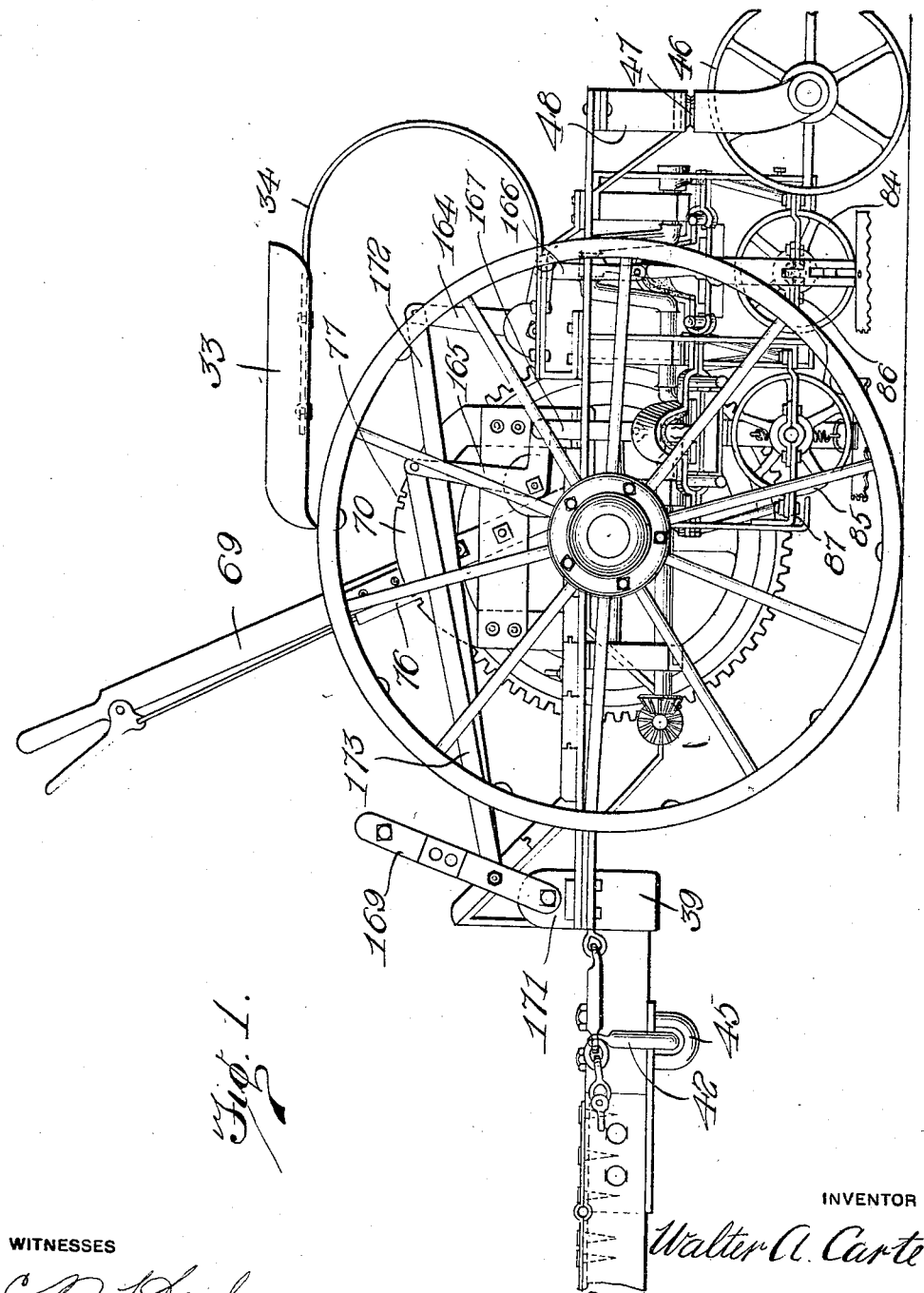

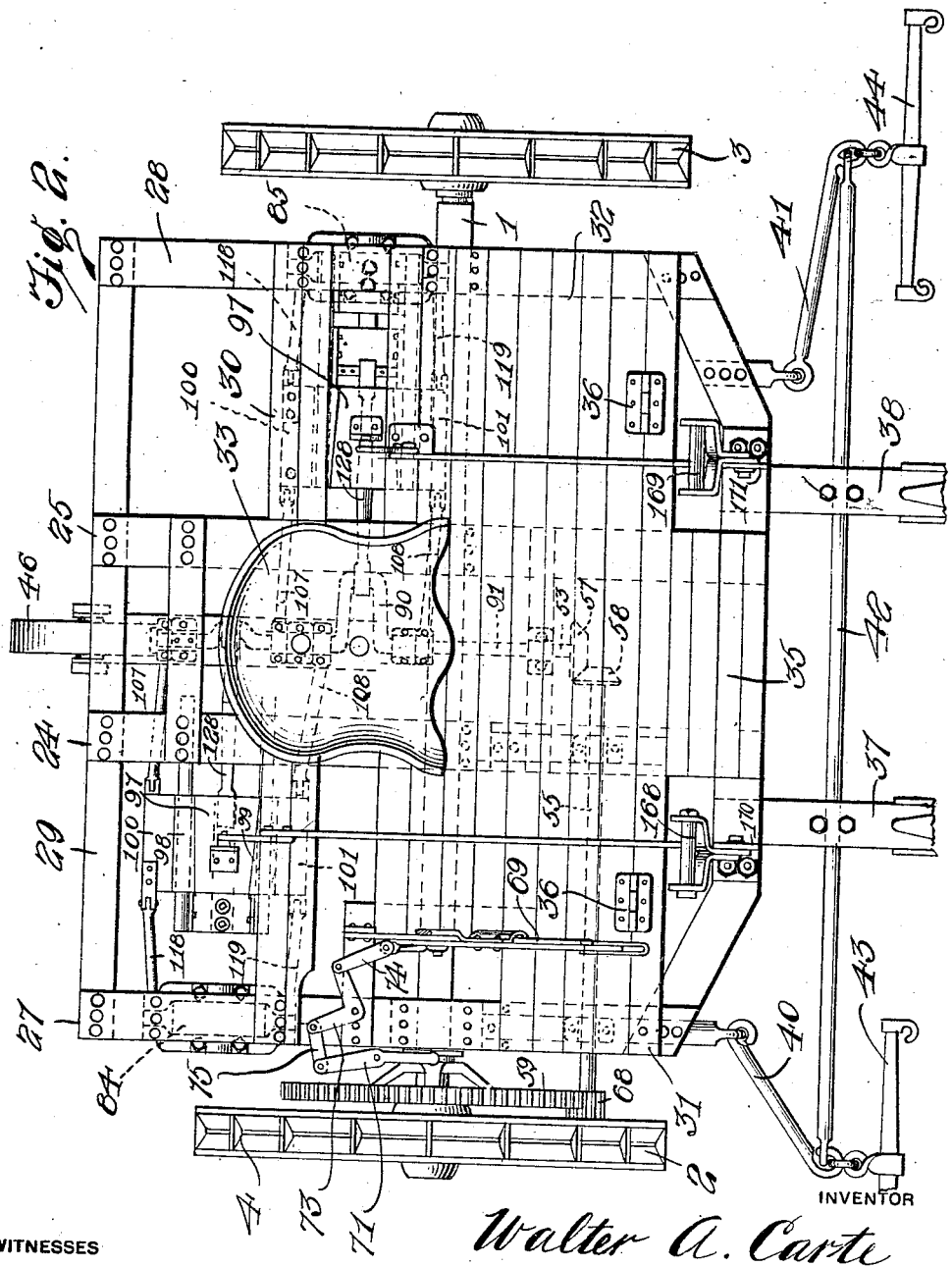

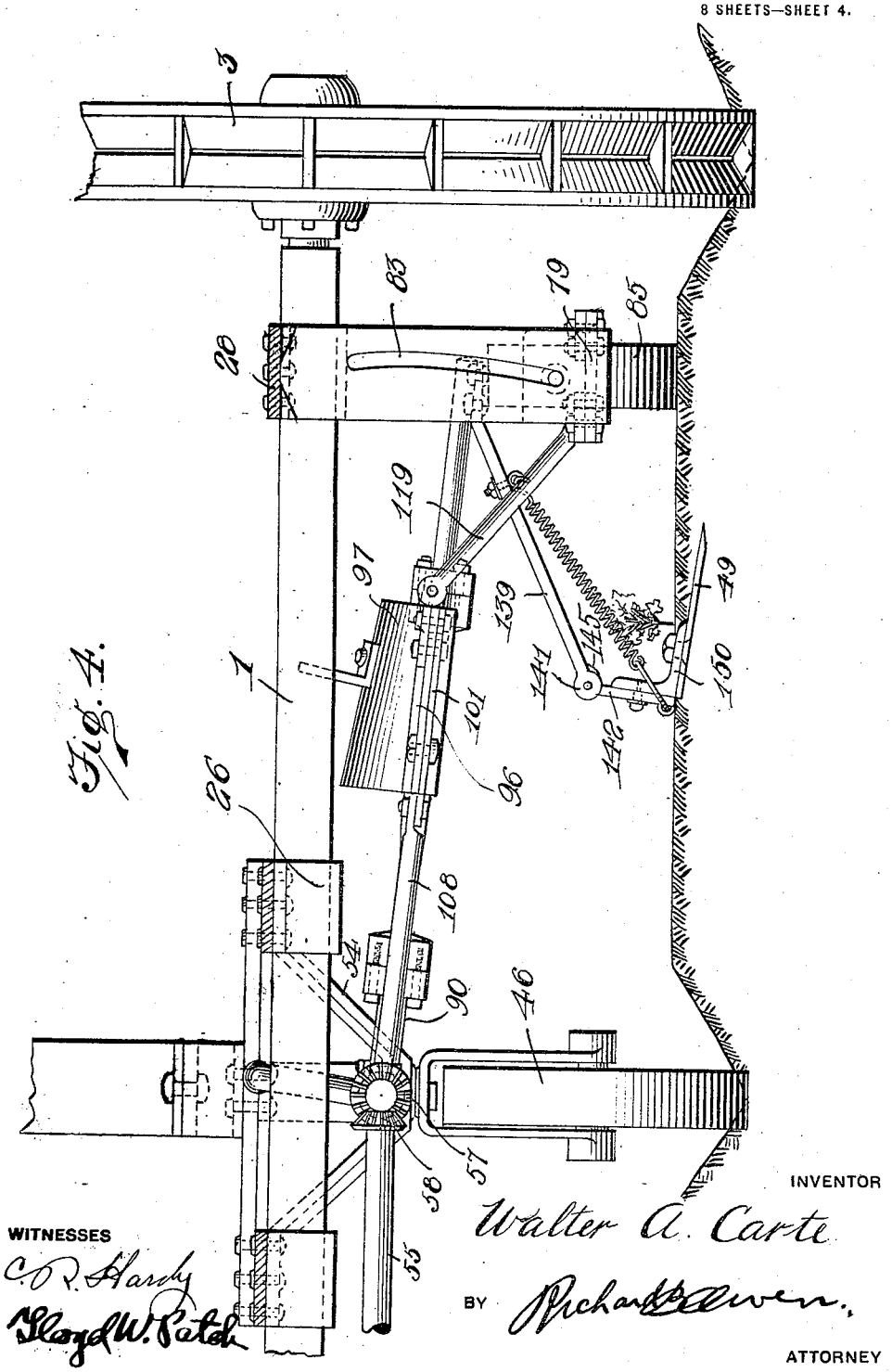

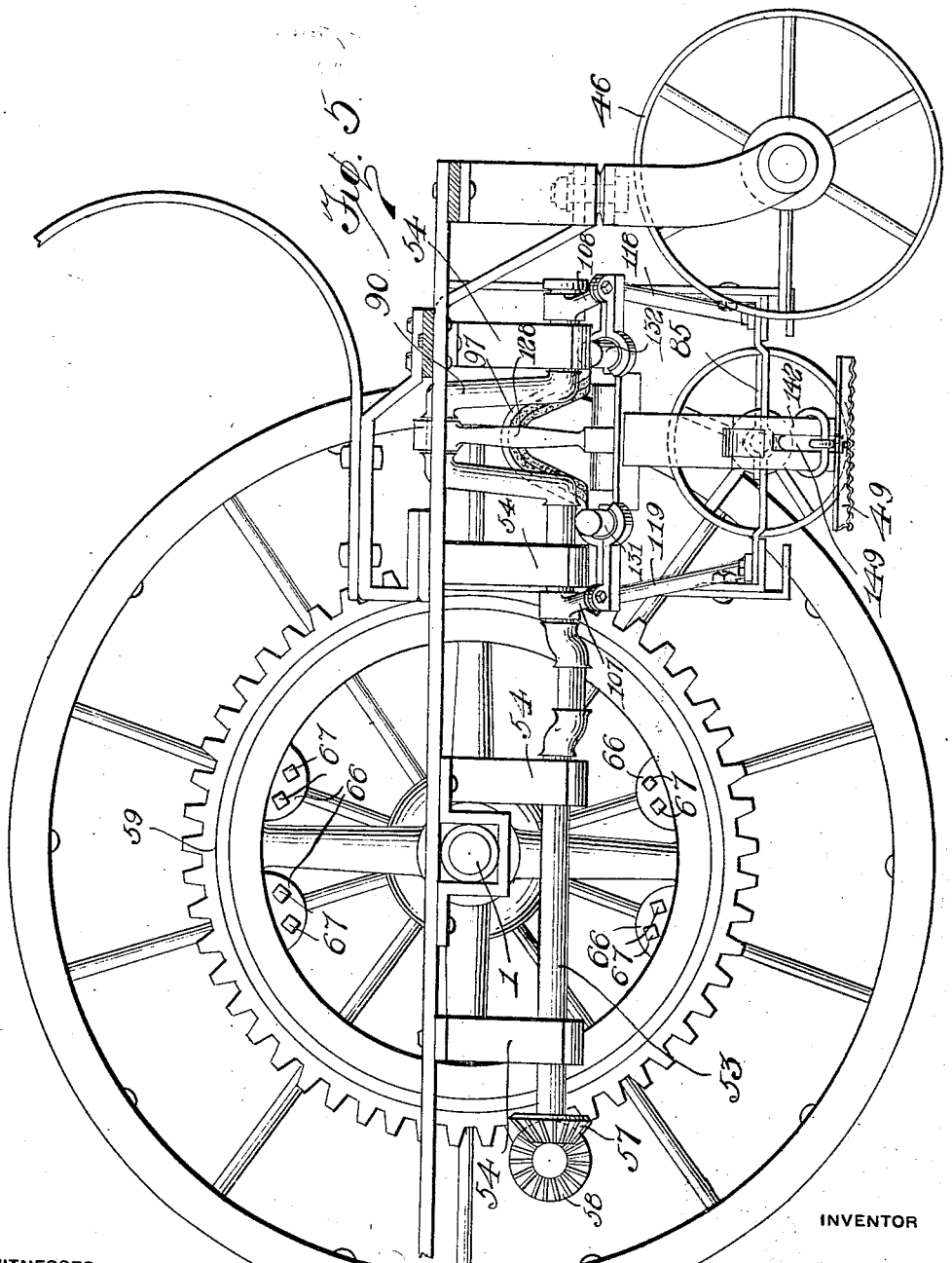

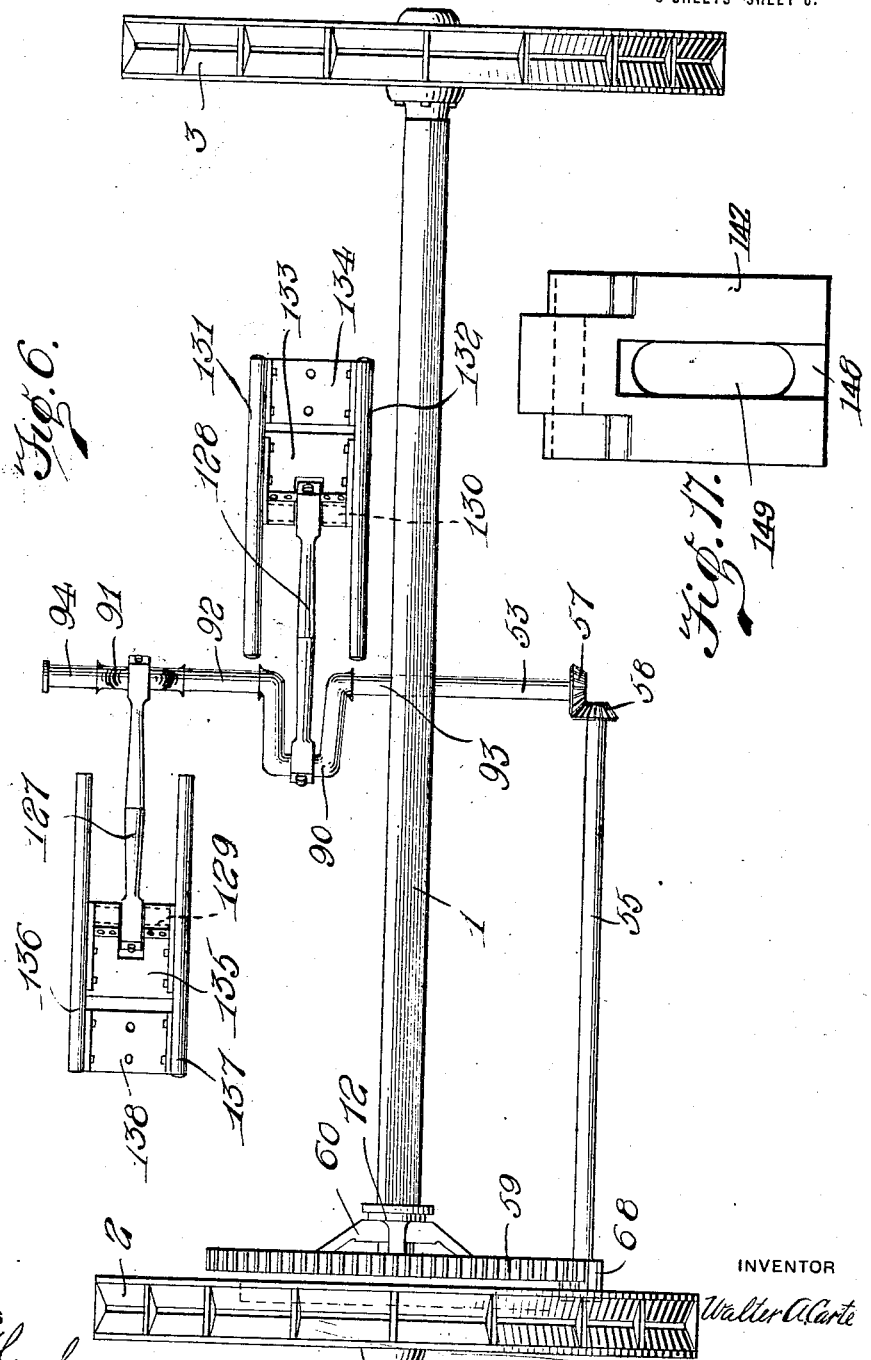

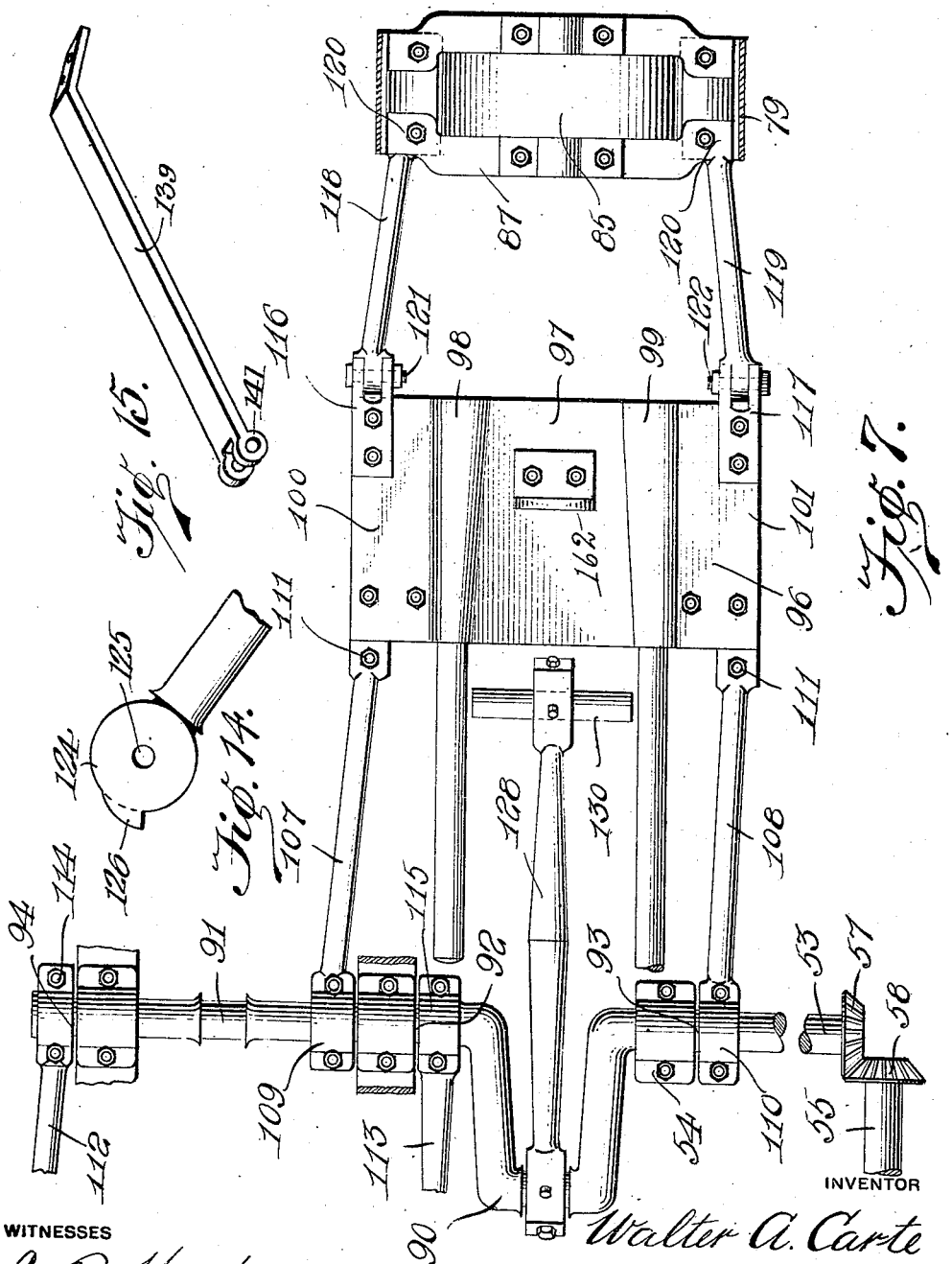

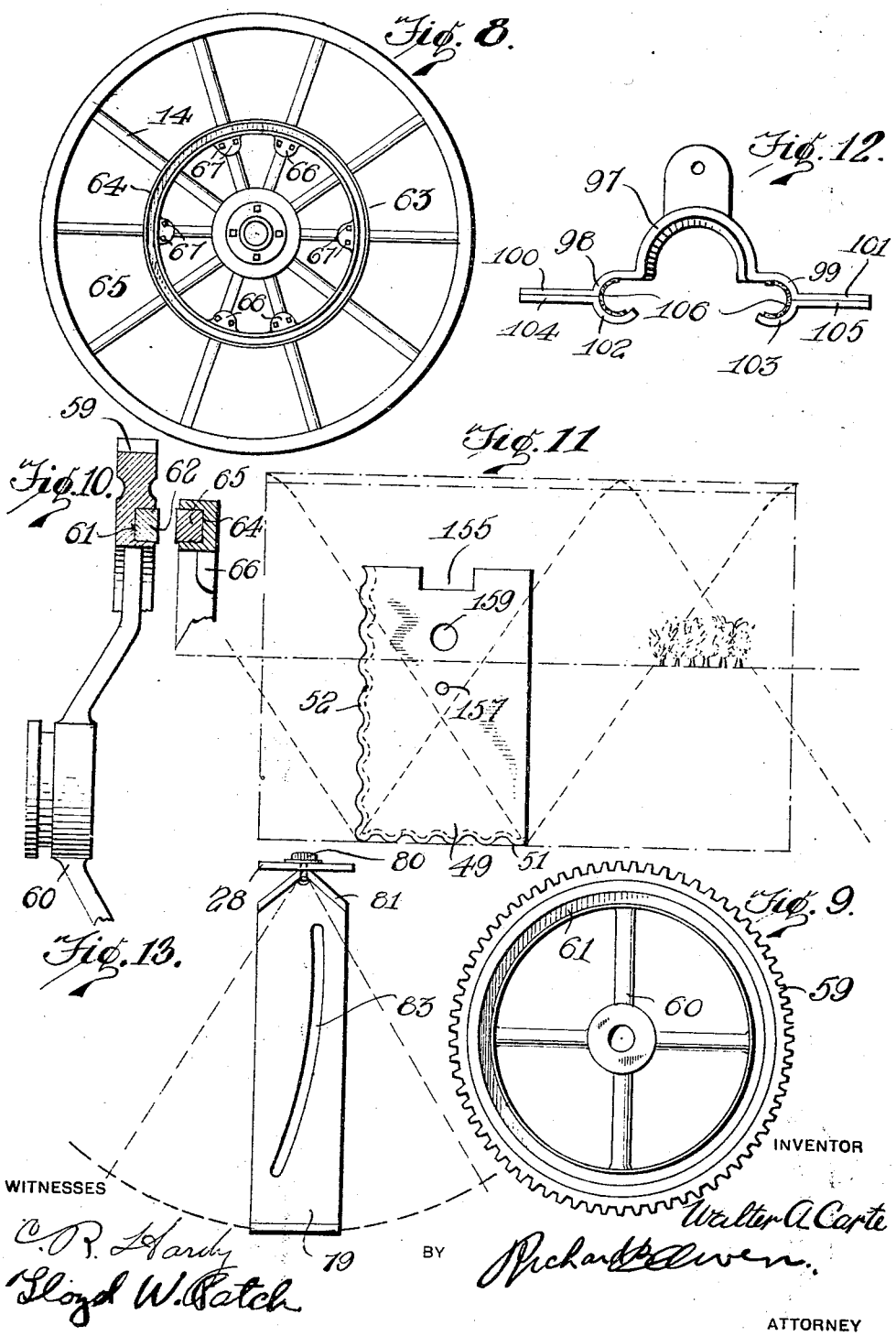

UNITED STATES PATENT OFFICE.

WALTER A. CARTE, OF BUTTE, MONTANA.

COTTON AND SUGAR-BEET CHOPPER.

1,283,664.     Specification of Letters Patent.     Patented Nov. 5, 1918.

Application filed February 21, 1916. Serial No. 79,693.

*To all whom it may concern:*

Be it known that I, WALTER A. CARTE, a citizen of the United States, residing at Butte, in the county of Silverbow and State of Montana, have invented certain new and useful Improvements in Cotton and Sugar-Beet Choppers, of which the following is a specification.

An object of my invention is to provide a machine which may be used for blocking out or thinning young cotton or sugar beet plants as they stand in the rows where they have sprouted from the seeds planted by a drill or in any other approved manner and which machine may be horse-drawn.

A further object is to so construct the machine that the thinning hoes are caused to operate upon two adjacent rows in a single course of travel of the machine across a field and to so arrange the parts operating the same that the digging and return movement of the two hoes is timed to maintain a substantially constant draft on the animals drawing the machine.

Yet another object is to provide operating means for the hoes which is arranged to receive its driving power from the carrying wheels and which has a shift so associated therewith that the operating means may be thrown into and out of the driving connection at the will of the operator.

A still further object lies in the provision of pilot wheels with which the hoes are connected in such a manner that as these pilot wheels strike an obstruction or an uneven surface on the ground over which the machine is traveling, the hoes will be raised to compensate for the inequality in the surface, and to also provide manually operable means by which the hoes may be moved from their digging position and from the operative relation.

With the above and other objects in view, my invention consists in certain novel features of construction and combinations of parts which will hereinafter be set forth in connection with the accompanying drawings and then pointed out in the claims.

In the drawings:—

Figure 1 is a view in side elevation of the machine with the hoes shown raised to the inoperative relation.

Fig. 2 is a view in top plan of the structure disclosed in Fig. 1.

Fig. 3 is a view in front elevation of the machine with the hoes shown in the operative relation.

Fig. 4 is a fragmentary sectional view of the right hand end of the machine as disclosed in Fig. 3.

Fig. 5 is a fragmentary sectional view taken from front to back of the rear portion of the machine to better illustrate the driving connection to the hoes.

Fig. 6 is a detail plan view to show the hoe operating drive.

Fig. 7 is an enlarged view of the parts shown in Fig. 6 with other of the parts associated therewith illustrated in place.

Fig. 8 is a view in elevation of the driving wheel, this view taken from the inside to show the clutch associated therewith.

Fig. 9 is a view in elevation of the driving gear.

Fig. 10 is a fragmentary sectional view to illustrate the arrangement of the clutch parts in the power transmission to the hoes.

Fig. 11 is a schematic view to illustrate the path taken by the hoes across the row as the machine is operated.

Fig. 12 is a detail view in end elevation of the guides by which the hoe operating pistons are maintained in the operative relation.

Fig. 13 is a detail view of one of the guides by which the pilot wheels are maintained in proper relation.

Fig. 14 shows the upper end of one of the connecting rods mounted between the pilot wheel and the operating piston of one of the hoe actuating means.

Fig. 15 is a view in perspective of the hoe supporting spring rods.

Fig. 16 is a view in end elevation of the hoe supporting plate.

Fig. 17 is a view in front elevation of the members disclosed in Fig. 17.

Fig. 18 is a view in side elevation of one of the hoe carrying shoes.

The supporting axle 1 which is shown in the present disclosure as being squared throughout the greater portion of its length is turned down or otherwise formed at its ends to provide bearing portions and the carrying wheels 2 and 3 are mounted on these bearings, the wheel 2 in the present instance acting also as the power wheel, the connection of the same being hereinafter set forth. It is preferable that these carrying wheels be of steel or other metal and that the rims thereof be made of the usual type commonly adapted for use on agricultural implements so that skidding or swerving of the machine will be prevented, and in the case of the power wheel 2 at least, the clogs or ribs 4 are disposed within the V-shaped groove so that as the wheel travels over a hard surface, these clogs or ribs do not project beyond the edges of the rim portion, but as the machine travels over cultivated or loose ground, the clogs or ribs 4 will sink into the same and will give sufficient grip on the ground that the power wheel 2 will be caused to turn at all times. If desired, the carrying wheel 3 will also be provided with these clogs, however, it is not essential that this construction be resorted to, as it is really immaterial whether the wheel be turned at all times in unison with the wheel 2.

The longitudinally extending frame members 24 and 25 are secured on the axle 1 by means of the clips 26 and end frame members 27 and 28 are mounted in a like manner near the end of the axle 1, the transversely extending frame members 29, 30, and 31 being connected across the frame members 27, 24, 25, and 28, to thus establish a rectangular supporting frame structure. A floor 32 is built on this rectangular frame structure on the forward part and a seat 33 which may be of the usual type applied to riding agricultural implements is supported by the mounting spring 34 at a point above the floor 32.

At the forward edge of the rectangular frame structure suitable supports are provided and the floor structure is continued over these supports to form the foot rest shown at 35. It is preferable that the forward parts of the floor be mounted, as by hinges 36, to permit raising of the same and to thus allow access to be had to the gears, bearings, etc., carried under the forward part of the frame. The draft means which is connected with the forward part of the frame has the tongue members 37 and 38 mounted to be capable of upward swinging movement, these tongue members being made up to two members hinged together, and the inner members thereof being connected rigidly by the clips 39 on the forward part of the frame. Draw bars 40 and 41 are connected at their inner ends with the frame and a spreader bar 42 is connected across between the outer ends of these draw bars 40 and 41 to hold the same disposed at an angle outwardly, so that the swingletrees 43 and 44 may be mounted at such points that when draft animals are hitched thereto, they will travel in the furrows or in the clear spaces between the rows, the tongue members 37 and 38 being spaced apart for this purpose and to hold the draft animals and guide them in the proper course. By providing the flexible connections between the outer and the inner members forming each tongue, the tongue members 37 and 38 are free to have up and down swinging movement without affecting the disposition of the main frame, and by running the separating bar 42 through the links or staples 45, a structure is provided which will permit of more or less shifting movement of the parts to relieve the jar and strain upon the draft animals, but which will at the same time, hitch the animals in such position that the rows of young plants will not be trampled.

By reason of the fact that the connection of the tongue members 37 and 38 with the main frame of this machine is a more or less flexible connection, some means must be provided to mount and carry the rear end of the frame structure and to accomplish this end, the trailing wheel 46 is provided, this wheel being mounted in the swivel bearing 47 of the supporting side part 48 which is connected with the rear end of the frame structure to depend downwardly therefrom at a point substantially centralized between the side members 27 and 28. By spacing the carrying wheels 2 and 3 at a considerable distance and then by locating the trailing wheel 46 at a point midway between these carrying wheels, a supporting mounting is provided which will straddle the rows of plants in the manner shown in Fig. 3 and in case the machine is used as a cotton chopper, the wheels 2 and 3 and the trailing wheel 46 will ride in the furrows between the rows.

In the use of the device, the hoes 49 and 50 are carried by the supporting structure as hereinbefore set forth and are connected to be actuated so that as the machine is drawn forward in line with the rows of plants, each of the hoes will be given movement in a back and forth swinging path thus causing the knives to prescribe a tortuous path over and through the ground adjacent the row, this path being better illustrated in Fig. 11 by the dotted lines where the blade 49 centered with the path of movement of the forward cutting edge 51 thereof is illustrated. It is the purpose that each of the hoes 49 and 50 shall be given one complete swinging movement across and recrossing the row in each foot of linear extent of the row traversed and that this swinging movement shall clear out perhaps nine inches of the lineal foot, thus leaving the plants in the row for the remaining three inches of the foot. The above treatment is perhaps particularly well adapted for blocking or thinning the rows in which cotton plants have sprouted, and in adopting the machine for use in thinning sugar beets, it may be desirable that a shorter stroke and a quicker swinging action of the hoes shall be accomplished, however, this adjustment can be readily made to meet with the particular requirements by varying the ratio of the driving gears of the power transmission mechanism to be hereinafter described. As shown in Fig. 11, the outer edge 51 and the forward edge 52 of each of the hoes 49 and 50 is serrated or given an undulating wave along its extent and the lower side of the blade at these edges is beveled to give a cutting edge thereon.

A cranked operating shaft 53 is mounted beneath the frame structure and under the axle 1, this crank operating shaft being supported by the shaft hangers or bearings 54 which are connected with the lower sides of the frame members 24 and 25. A power transmission shaft 55 is mounted beneath the frame structure in the bearing 56 and has its inner end adjacent the inner end of the crank operating shaft 53, the bevel or miter gears 57 and 58 being provided on the crank operating shaft 53 and on the power transmission shaft 55 to mesh so that as movement is given to the transmission shaft 55, the crank operating shaft 53 will be rotated in its bearing.

The bearing spindle at one end of the axle 1 is made of a greater extent than is necessary for the fitting of the hub of the power wheel 2 thereon, and a driving gear 59 has the hub thereof bored to have a loose fit on the axle spindle so that this driving gear may have free turning and sliding movement on the axle spindle or skein, the spoke and hub structure 60 of the wheel 59 being dished out to clear the hub casing extent of the power wheel 2. This gear wheel 59, as is better illustrated in Figs. 9 and 10, has the rim thereof provided with an annular groove or seat 61 in which the friction clutch band 62 is received. A clutch ring 63, now referring more particularly to Figs. 8 and 10, has the annular groove or seat 64 provided in one face thereof to receive the friction clutch band 65, and this ring 63 has the lugs 66 provided to extend from the inner circumference thereof at spaced apart points corresponding to the space of the spokes of the wheel 2, these lugs 66 being bored through to permit the securement of U-shaped clamping clips or other suitable fastening means around the spokes 14 and through these lugs 66, the clamping nuts 67 being screwed onto the inner ends of the U-shaped clips to hold the rings secured in the proper relation. A driving pinion 68 is mounted on the outer end of the power transmission shaft 55 to mesh with the teeth of the driving gear 59 and this driving pinion 68 is made of a greater width than the width of the rim of the wheel 59 so that as this driving gear wheel 59 is shifted, the teeth thereof will be at all times in mesh with the teeth of the driving pinion 68.

By mounting the clutch ring 63 on the spokes of the wheel 2 as set forth, the friction band 65 is in line with the friction band 62 of the driving gear 59 and shifting of this driving gear around the spindle of the axle 1 will cause these bands 62 and 65 to be brought to a frictionally engaged relation so that as the machine is drawn forward and the power wheel 2 is caused to turn through the grip secured in the earth by the clogs or ribs 4, the driving gear 59 will be turned with this wheel 2 and through the meshing of the wheel 59 with the driving pinion 68, the power transmission shaft 55 will be caused to rotate and will rotate the crank operating shaft 53 through the geared connection established therebetween by the miter gears 57 and 58. An operating lever 69 is pivotally mounted on a segmental rack 70 which is secured on the frame structure, and a shifting fork 71 is mounted at the edge of the frame structure to be capable of swinging movement and with the forked end thereof fitted in the groove 72 formed around the inner end of the hub structure 60 of the driving gear 59. A bell crank lever 73 is mounted on the side bar 27 and a link 74 is connected between the operating lever 69 and one of the arms of the bell crank lever 73, the remaining arm of this lever being connected by the link 75 with the free end of the shifting fork 71. The operating lever 69 is provided with a stop 76 which is preferably spring pressed and is received in the teeth notches 77 of the segmental rack 70, these notches being provided at such points that the operating handle or lever 69 may be moved to a forward position where the connection between the same and the shifting fork 71 will cause the driving gear 59 to be moved to a position where the band 62 thereof is out of contact with the band 65 of the ring 63, and when the operating lever 69 has been moved to the other extreme position a drawing tension will be exerted on the bell crank lever and consequently transmitted to the shifting fork 71 to cause the driving gear wheel 59 to be brought to a position with the friction band thereof engaged with the friction band 65 carried by the power wheel 2 and in consequence, power will be transmitted as hereinbefore set forth.

Suitable yoke shaped hangers or supports 78 and 79 are mounted beneath the sides members 27 and 28 to depend downwardly therefrom, the structure of one of these members being better shown in Fig. 13, and as is here illustrated, the mounting bolts 80 are passed through the ribs of an angularly shaped portion 81 on each of the supporting members or hangers so that these members will be capable of swinging movement to each side in an angle of perhaps 30°, this disposition of the parts in the swinging relation being shown by the dotted lines in Fig. 13. The hanger or supporting members 78 and 79 have the arcuated slots 82 and 83 formed in the transverse extent thereof, these slots being arcuated on a radius taken from the shaft 53 as a center, and the pilot wheels 84 and 85 have the shafts thereof journaled in bearings provided in the carriers 86 and 87, which carriers are mounted between the forwardly and rearwardly disposed members of hangers 78 and 79, and the bolts or pins 88 and 89 are passed through the arcuated slots 82 and 83 of the hanger or supporting members 78 and 79 and are secured in the carriers 86 and 87 to thus mount the pilot wheels 84 and 85 to be held against forward or back displacement and yet to be capable of side swinging movement with the hanger members 78 and 79, and of vertical adjusting movement through the arcuating slots 82 and 83 thereof.

The operating shaft 53 which is preferably a single bar of metal shaped to the proper form and the crank portions 90 and 91 of this shaft are disposed to extend therefrom in a relation separated by an angle of 90°, or in other words, these crank portions extend from the shaft a quarter turn apart, and it is preferable that the pilot wheel 84 be placed with its shaft in line with the crank 90, whereas the pilot wheel 85 has its shaft in line with the crank 91. The operating shaft 53 has a bearing 92 provided between the crank arms 90 and 91 thereof and the bearing portions 93 and 94 are provided on the shaft beyond the bearings 90 and 91. The shaft hangers 54 are received around these bearings to mount the shaft to be capable of rotary movement through the driving connection established with the power wheel 2 in the manner hereinbefore described.

The slide bearings 95 and 96 are provided on each side of the shaft 53, the bearing member 96 being mounted in line with the crank 90 and bearing member 95 being in line with the crank 91. As is better illustrated in Fig. 12, these bearing members 95 and 96 comprise a hood 97 which is substantially semicircular in cross section in its body portion and has the edges thereof rolled at 98 and 99 and then extended into the lips 100 and 101, the rolled portion 98 and 99 being formed to an arc to provide the upper half of the slide bearing. Bearing members 102 and 103 are provided with the lips 104 and 105 and these bearing members 102 and 103 are connected with the lips 100 and 101 of the bearing members 95 and 96 so that slide bearings opened at their inner sides are provided, and if desired, Babbitt, brass, or other suitable bearing lining 106 may be fitted to form the contact faces of the spaced apart slide bearings thus provided.

Referring now more particularly to Fig. 7, positioning rods 107 and 108 have bearing portions 109 and 110 formed on their ends to be received on the bearing portions 92 and 93 of the shaft 53, the remaining ends of these positioning rods being connected rigidly with the bearing member 96 through the medium of the clamp bolts 111. Similar positioning rods 112 and 113 have the bearing portions 114 and 115 thereof mounted on the bearing portions 94 and 92, and the outer ends of these positioning rods 112 and 113 are connected with the bearing member 105. Hinge bearings 116 and 117 are rigidly mounted on the outer ends of the lips 100 and 101 of the bearing member 96 and connecting links 118 and 119 are secured to the carrier member 87 by the clamp bolts 120 and are inclined upwardly to have bearing portions formed thereon received in the hinge bearings 116 and 117 where they are held by the hinged bolts 121 and 122. Connecting links 123 are secured to the carrier 86 and at their upper ends are hingedly connected with the bearing member 95 in a manner substantially identical with the manner of connecting the links 118 and 119. The connecting links 118, 119, and 123 are to all intents and purposes substantially duplicate, and in Fig. 14, I have better illustrated the bearing portion 124 of one of these members by which the hinged connection is established with the bearing members 95 and 96. As here shown, the connecting link or rod is flapped back at its upper end to form the bearing disk 124 which has the opening 125 therethrough to affix the pivot or hinged bolt or pin, and a stop 126 is provided to extend from the disk-like bearing portion 124 and to have engagement with the upper side of the bearing carried by the bearing members 96 and 97 so that the connecting links or rods 118, 119, and 123 are not only disposed in a diagonally extending relation from the bearing members 96 and 97 but are at the same time maintained against movement upward from a predetermined angle, while at the same time being arranged to permit swinging movement of the carriers 86 and 87 and consequently the pilot wheels 84 and 85 downwardly.

Referring now again more particularly to Figs. 6 and 7, the pitman rods 127 and 128 are connected with the cranks 91 and 90, the opposite ends of these pitman rods having the wrist pins 129 and 130 carried thereby. The slide rods 131 and 132 are connected together by a plate 133 which is bolted or otherwise secured therebetween to hold these slide rods in a parallel and spaced apart relation. These slide rods 131 and 132 have a mounting plate 134 connected between the outer ends thereof, and the plate 133 by which the slide rods are connected in their parallel relation is rolled or otherwise formed into a bearing over the wrist pin 130 so that the pitman rods 128 may have swinging movement with respect to the plate 133 and the slide rods connected thereby. A plate 135 connects the slide rods 136 and 137 and a portion of this plate is rolled over the wrist pin 129 to connect the slide rods to be carried by the pitman rod 127, a mounting plate 138 similar to the plate 134 being connected between the slide rods at the outer end thereof. By mounting the slide rods 131 and 132 as a pair connected to the wrist pin of the pitman rod 128 and the slide rods 136 and 137 connected with the wrist pin of the piston rod 127, I have formed two piston-like structures which may be mounted with the slide rods thereof received in the slide bearings of the bearing members 96 and 95 respectively, and as the operating shaft 53 is turned through the shifting of the driving gear 59 to a position that the friction band thereof is engaged with the friction band of the power wheel 2, these piston-like structures will be given reciprocatory movement within the bearing members and the mounting plates 134 and 138 will consequently be moved in a reciprocatory path.

A mounting bar 139 is connected with the mounting plate 134 receiving reciprocatory movement from the crank 90, and a similar mounting bar 140 is connected with the mounting plate 138 also actuated by the turning of the operating shaft 53 and receiving reciprocatory movement from the crank 91, these mounting bars being preferably riveted or otherwise rigidly secured to the mounting plates so that they will extend in a diagonally disposed relation downwardly and inwardly. As is better shown in Fig. 15, the mounting bars are preferably of flat spring metal and have the hinge bearings 141 at their lower ends. The hoe mounting plates 142 and 143 are each provided with a bearing portion 144, better shown in Figs. 16 and 17, which bearing portion is to be received in conjunction with the bearing portion 141 of the mounting bars 139 and 140 and a hinged connection of the mounting plates 142 and 143 is accomplished by passing hinged pins through the bearing portions thereof and of the mounting bars. The mounting plates 142 and 143 have the stop portions 145 formed adjacent the bearings thereof to engage with the mounting bars 139 and 140 as these mounting plates are given a predetermined swinging movement outwardly, the coil springs 146 and 147 being connected between the mounting plate 142 and the mounting bar 139 and the mounting or carrying plate 143 and the mounting bar 140 respectively to maintain the mounting or carrying plates normally in a relation with the stop 145 thereof in engagement with the mounting bars, this being the relation shown in the several figures and the carrying plates being thus held resiliently against swinging movement inwardly.

The carrying plates 142 and 143 have the inner faces thereof provided with the vertically disposed grooves 148, and the elongated slotted openings are provided through these plates in registry with the grooves. Hoe mounting shoes 150 and 151 which are made substantially L-shaped have the ribs 152 extending vertically on the upright arms thereof to be received in the grooves 148 of the carrying plates 142 and 143, and this upright arm of each of the shoes is provided with an orifice 153 registering with the slotted openings 149, the clamp bolts 154 being received through the slotted openings and the orifices 153 of the shoes 150 and 151 to hold these respective shoes secured in the proper position on the mounting plates 142 and 143, the slotted formation of the opening 149 permitting the shoes to be given slight adjustment and the fitting of the ribs 152 in the grooves 148 holding the shoes against side twisting movement. The rib 152 is extended downwardly below the lower face of the shoes 150 and 151, and as is better shown in Fig. 11, the hoe member 49 and 50 have the inner edges thereof notched or cut away at 155 to receive this projection 156, the hoe blade also being provided with the opening 157 formed in the body thereof to receive the stud or lug 158 carried on the lower faces of the shoes, these projections and lugs holding the hoe blade against turning or twisting movement. An opening 159 is provided through each of the hoe blades at a point between the disposition of the opening 157 and cut away portion 155 and this opening 159 registers with an opening 160 which is provided through the horizontally disposed arm of the shoe so that the clamping bolts 161 may be fitted through the hoe plates 49 and 50 and the shoes 151 and 150 to mount these hoe plates in the proper operative position.

As has been set forth, the hangers or supports 78 and 79 are flexibly connected with the frame so that they may have swinging movement to each side of the normal position, and through the fact that the bearing members 95 and 96 are mounted at one end by the pivotal connection on the bearings of the operative shaft 53 and the remaining ends of these bearing members are supported from the pilot wheels 84 and 85 through the connecting links 123 and 118 and 119, as uneven ground is encountered by the pilot wheels 84 and 85, or as these wheels may strike an obstruction, the wheels will be raised in a swinging path around the bearings of the shaft 53 as a center and will ride through the arcuated slots 82 and 83. By the fact that the hoe blades 49 and 50 are carried directly by the mounting plates 134 and 138 which are carried directly by the carrying members 95 and 96, these hoe blades will be raised correspondingly with the pilot wheels and will also pass over the obstruction. On some occasions, the field will contain obstructions, such as rocks, stumps, and the like, which will not cover any considerable ground area and which are not of sufficient extent to be engaged by the pilot wheels 84 and 85, but which at the same time, would be contacted by the hoe blades 49 and 50 and would cause injury to the same through this contact, and for this reason, it is particularly desirable that some means of manually raising the hoe blades from their operative positions be provided. With this purpose in mind, the bearing bracket members 162 and 163 are mounted on the hood portion of the bearing members 95 and 96, the bell crank operating levers 164 and 165 are connected with these bearing brackets 162 and 163 through the medium of the links 166 and 167, the bell crank operating levers 164 and 165 being mounted on suitable bearings carried by the frame structure so that their free arms extend substantially upwardly. The foot levers 168 and 169 are mounted at their lower ends on suitable bearings 170 and 171 carried by the frame structure and it is preferable that the bearings by which the foot levers are mounted be in line with the bearings mounting the bell crank members 164 and 165. A draw bar 172 is connected between the bell crank lever 164 and the foot lever 168, and a draw bar 173 is connected between the bell crank lever 165 and the foot lever 169. By connecting the parts in the manner hereinbefore set forth, the operator when sitting in the seat 33 may place his feet on the tread members of the foot levers 168 and 169 and as an obstruction is about to be encountered by the hoe blades, pressure can be exerted upon one of the foot levers to cause the bell crank lever connected therewith by the draw bar to be swung upwardly or around its pivotal mounting on the frame and through the links connected with the bearing member from which the hoe blade is supported, this bearing member will be given swinging movement upwardly in an arc around the operating shaft 53 as a center, the hanger or supporting member 78 or 79 as the case may be, will be swung inwardly through the fact that the pilot wheels 84 and 85 are carried by the bearing members and connected therewith in such a relation that downward swinging movement of the same is permitted and thus the hoe blades will be raised out of the operative relation and may be retained in the inoperative position until the obstruction is passed or for that matter, locking means of any of the several kinds well known in the art, might be provided to secure the foot levers 168 and 169 in the forwardly swung relation to permanently support the hoe blades 49 and 50 in the raised position, and when the pressure is released from the foot levers 168 and 169, the parts will return through their own weight to the operative position as shown in Fig. 3 of the accompanying drawings, and as the machine is carried over the field on the wheels 2 and 3 and on the trailing wheel 46, the pilot wheels 84 and 85 will hold the hoe blades 49 and 50 carried at the proper elevation with respect to the ground in which the plants are growing.

While an endeavor has been made to set forth the operation of the parts as the description has progressed, it is believed that a résumé of the operation of the parts and their coöperative connection and movement with the remaining structure will aid in a proper and full understanding of the device. The main frame structure is carried on the wheels 2 and 3 and on the trailing wheel 46, the latter being mounted in a swivel bearing to be capable of turning movement to permit the entire machine to be readily turned and the power wheel 2 being provided with clogs or ribs extending transversely in the grooved rim thereof to insure that this wheel will be given rotary movement at all times during the travel of the machine. The power wheel 2 is made of a diameter that its circumference is approximately nine feet and in the treating of or operation upon rows of cotton plants where approximately nine inches of each linear foot of the row is to be cleared, the parts will be so arranged that the hoe blades 49 and 50 will make one complete movement in their reciprocatory path for each foot of the length of the row, which may be traversed, thus making it essential that the parts by which movement is transmitted from the drive wheel 2 be so arranged that the complete reciprocatory movement takes place nine times during one revolution of the drive wheel. The operating lever 69 is set with the latch 76 thereof in the teeth 77 and thus the driving gear 59 is moved to a relation that the friction ring 62 thereof has engagement with the friction ring carried by the wheel 2, thus causing the gear 59 to be rotated. Power is transmitted from the drive gear 59 through the pinion 68 secured on the power transmission shaft 55 so that this shaft is caused to turn and through the bevel gears 57 and 58, transmits movement to the operating shaft 53. Rotation of the operating shaft 53 causes the pitman rods 127 and 128 to transmit reciprocatory movement to the mounting plates 134 and 138, and through the fact that the spring mounting bars 139 and 140 are secured to these mounting plates, the carrying or mounting plates 142 and 143 together with the shoes 150 and 151 and the hoe blades 50 and 49 carried thereby are caused to have a reciprocatory movement. The stops 145 of the carrying or mounting plates 142 and 143 hold these plates against too great outward swinging movement and the coil springs 146 and 147 which are mounted between the carrying plates and the mounting bars, exert a substantially resilient drawing tension to augment the resilient action of the mounting bars 139 and 140 and to resiliently hold the carrying plates 142 and 143 in a relation that the hoe plates 49 and 50 are presented in the proper operative relation. By beveling or sharpening the hoe plates 49 and 50 from the under side, the resisting force exerted against these edges in the digging action of the hoe blade is upwardly and the action of the spring 146 and 147 is augmented as it were. This side swinging movement or reciprocation of the hoe blades 49 and 50 will cause the same to take substantially the path shown by the dotted lines in Fig. 12 as the machine is carried forward during this reciprocation action and by this arrangement of the parts, the forward and end cutting edges 50 and 52 of the blades will be caused to cut through the row of young plants for the greater part of its travel and the outer end of the stroke will clear the row entirely so that the rows will be blocked off or the plants will be thinned out to leave the proper distance apart. It will of course be understood that when it is desired to throw the parts out of the operative relation so that the reciprocatory movement to the hoe blades will be stopped, the hand operating lever 69 will be swung to a forward position or to the relation shown in Fig. 1 and in this position of the parts, the drive gear 59 is shifted to bring the friction band thereof out of engagement with the friction band carried by the power wheel 12. The pilot wheels 84 and 85 will act under most circumstances to carry the hoe blades 49 and 50 at the proper elevation but these blades may be raised entirely from the operative relation through the medium of the foot levers 168 and 169 which may be operated either while the operating shaft 53 is being rotated or when the power has been disconnected.

While I have herein shown and described only one specific form of the invention, it will be understood that modifications can be resorted to in the form of power transmitting means, in the manually actuated shifting means, and in other points of the construction and in the combinations of the parts without departing from the spirit and scope of my invention, and hence I do not wish to be limited to the exact disclosure but only to such points as may be set forth in the claims.

I claim:—

1. A machine for blocking out or thinning plants growing in rows comprising a frame, carrying wheels by which the frame is mounted to be capable of movement over a field in line with the rows of plants, an operating shaft mounted on the frame, a pilot wheel mounted to be capable of movement with respect to the frame, a bearing member carried by the frame, a connection from the operating shaft to the bearing member, a flexible connection from the pilot wheel to the bearing member, a hoe blade, a mounting structure carried within the bearing member to be capable of reciprocatory movement, a connection from the hoe blade to the mounting member to cause reciprocatory movement of the hoe blade in a cutting path into and out of the rows of plants as the mounting member is actuated, and a connection from the operating shaft to the mounting means to cause reciprocatory movement of the same.

2. A machine for blocking out or thinning plants growing in rows comprising a supporting frame, carrying wheels by which the frame is mounted to be capable of movement over a field in line with the rows of plants, a cranked operating shaft supported by the frame to extend in line with the direction of travel of the machine, supporting hanger members carried by the frame, pilot wheels mounted in conjunction with the supporting hanger members to be capable of movement with respect to the frame, bearing members, carried by the frame, a connection from the operating shaft to the bearing members, a flexible connection from said bearing members to the pilot wheels, a mounting structure slidably connected in the bearing members, a hoe blade, a connection from the mounting structure to the hoe blade, a pitman rod from the crank of the operating shaft to the mounting structure to cause the hoe blade to be given reciprocatory movement into and out of cutting relation in the rows of plants as the operating shaft is turned, and a power connection to be shifted into and out of driving relation to impart movement from one of the carrying wheels to the operating shaft.

3. A machine for blocking out or thinning plants growing in rows comprising a supporting frame, carrying wheels by which the frame is mounted to be capable of movement over a field in line with the rows of plants, a cranked operating shaft supported by the frame to extend in line with the direction of travel of the machine, supporting hanger members carried by the frame, pilot wheels mounted in conjunction with the supporting hanger members to be capable of movement with respect to the frame, bearing members, carried by the frame, a connection from the operating shaft to the bearing members, a flexible connection from said bearing members to said pilot wheels, a mounting structure slidably connected in the bearing members, a hoe blade, a connection from the mounting structure to the hoe blade, a pitman rod from the crank of the operating shaft to the mounting structure to cause the hoe blade to be given reciprocatory movement into and out of cutting relation in the rows of plants as the operating shaft is turned, a power connection to be shifted into and out of driving relation to impart movement from one of the carrying wheels to the operating shaft, and manually operable means to raise the bearing member to shift the pilot wheel and the hoe blade to an inoperative position.

4. A machine for blocking or thinning plants growing in rows comprising a supporting frame, an axle on which the frame is mounted, carrying wheels mounted on the axle at each end thereof, a cranked operating shaft, a hoe blade mounted to be capable of reciprocatory movement in a cutting path into and out of the rows of plants, a pitman rod connected with the hoe blade and with the crank of the operating shaft, a driving gear carried by the axle to be loosely mounted thereon, and provided with a friction clutch ring, a power transmission shaft, gears connecting the power transmission shaft to rotate the operating shaft, a pinion on the power transmission shaft meshing with the drive gear, a friction ring mounted on one of the carrying wheels, and means to shift the driving gear to engage with the friction band thereof with the friction band of the carrying wheel to cause the drive gear to be rotated and through the power transmission shaft to cause turning of the operating shaft to actuate the hoe blade.

5. A machine for blocking out or thinning plants growing in rows comprising a supporting frame, an operating shaft supported by said frame, pilot wheels connected with the frame to be capable of movement, bearing members carried by the frame, positioning rods connected between the bearing members and the operating shaft, connecting links secured to the mounting of the pilot wheel and hingedly connected with the bearing members to permit upward swinging movement of the bearing members with respect to the pilot wheels and to preclude downward swinging movement thereof at a predetermined point, slide bearings provided in the bearing members, slide rods connected together to be received in the slide bearings and provided with mounting plates, cranks formed on the operating shaft, pitman rods connected from said shaft cranks to actuate the slide rods, mounting bars connected with the mounting plates, carrying plates hingedly connected with the mounting bars and provided with stops to engage against the same to hold the plates against swinging movement in one direction, shoes carried by the carrying plates, hoe blades mounted on the shoes, and springs connected between the mounting bars and the carrier plates to hold the hoe blades resiliently in the operative relation as reciprocatory movement is given to the same through the turning of the operating shaft and the actuation of the parts through the connection of pitman rods.

6. A machine for blocking out or thinning plants growing in rows comprising a cranked operating shaft having two cranks thereon arranged to extend apart at an angle of approximately 90°, bearing members mounted on each side of the operating shaft in line with the cranks thereof, reciprocating means mounted in the bearings, pitman rods connected from the cranks to actuate the reciprocating means, and hoe blades carried by the reciprocating means to be given reciprocatory movement as the operating shaft is turned to have movement in a path to cut into and out of the rows of plants as the machine is moved across the field.

7. A machine for blocking out or thinning plants growing in rows comprising a cranked operating shaft having two cranks thereon arranged to extend apart at an angle of approximately 90°, bearing members mounted on each side of the operating shaft in line with the cranks thereof, reciprocating means mounted in the bearings, pitman rods connected from the cranks to actuate the reciprocating means, hoe blades carried by the reciprocating means to be given reciprocatory movement as the operating shaft is turned to have movement in a path to cut into and out of the rows of plants as the machine is moved across the field, and manually operable means to throw the parts into and out of an operative relation.

8. A machine for blocking out or thinning plants growing in rows comprising a supporting frame, an axle extending transversely of the frame and on which the same is mounted, carrying wheels mounted on the ends of the axle, means by which draft may be applied to move the machine over a field in line with the rows of plants, an operating shaft mounted centrally of the frame in line with the direction of travel and provided with a pair of operating cranks spaced apart approximately on the quarter turn, a trailing wheel connected on the rear portion of the frame to give additional support, supporting hangers mounted flexibly on the rear portion of the frame near each side thereof, carrying members located on each side of the operating shaft in line with the cranks thereof, pilot wheels movably carried by said supporting hangers to be substantially in line with the crank arms of the operating shaft, positioning rods rigidly connected with the bearing members and connected around the operating shaft, connecting links rigidly connected with the mounting of the pilot wheels and hingedly connected with the bearing members to permit downward swinging movement of the pilot wheels with respect to the bearing members and to stop upward swinging movement thereof at a predetermined setting, a pair of slide rods connected by a connecting plate to be received in the bearings of the bearing members and to be capable of sliding movement, mounting plates carried by the slide rods, pitman rods connected to the sliding structure and with the crank arms to cause the mounting plates to be given reciprocatory movement as the operating shaft is turned, mounting bars connected with the mounting plates to extend diagonally downwardly and inwardly therefrom and provided on their inner ends with parts of a hinged joint, carrying plates hingedly connected with the mounting bars to have movement outwardly thereof limited, mounting shoes secured on the carrying plates to be adjustable in their height of disposition, hoe blades carried by the shoes, coil springs connected between the carrying plates and the mounting bars to hold the carrying plates resiliently moved to a relation that the hoe blades are presented in an operative position, and means arranged to turn the operating shaft to cause actuation of the parts.

9. A machine for blocking out or thinning plants growing in rows comprising a supporting frame, an axle extending transversely of the frame and on which the same is mounted, carrying wheels mounted on the ends of the axle, means by which draft may be applied to move the machine over a field in line with the rows of plants, an operating shaft mounted centrally of the frame in line with the direction of travel and provided with a pair of operating cranks spaced apart approximately on the quarter turn, a trailing wheel connected on the rear portion of the frame to give additional support, supporting hangers mounted flexibly on the rear portion of the frame near each end thereof, carrying members located on each side of the operating shaft in line with the cranks thereof, pilot wheels movably carried by said supporting hangers to be substantially in line with the crank arms of the operating shaft, positioning rods rigidly connected with the bearing members and connected around the operating shaft, connecting links rigidly connected with the mounting of the pilot wheels and hingedly connected with the bearing members to permit downward swinging movement of the pilot wheels with respect to the bearing members and to stop upward swinging movement thereof at a predetermined setting, a pair of slide rods connected by a connecting plate to be received in the bearings of the bearing members and to be capable of sliding movement, mounting plates carried by the slide rods, pitman rods connected to the sliding structure and with the crank arms to cause the mounting plates to be given reciprocatory movement as the operating shaft is turned, mounting bars connected with the mounting plates to extend diagonally downwardly and inwardly therefrom and provided on their inner ends with parts of a hinged joint, carrying plates hingedly connected with the mounting bars to have movement outwardly thereof limited, mounting shoes secured on the carrying plates to be adjustable in their height of disposition, hoe blades carried by the shoes, coil springs connected between the carrying plates and the mounting bars to hold the carrying plates resiliently moved to a relation that the hoe blades are presented in an operative position, a power drive gear mounted on the axle in proximity to one of the carrying wheels, friction bands mounted on the drive gear and carrying wheel, a power transmission shaft, a geared connection from the power transmission shaft to the operating shaft, a pinion on the power transmission shaft meshing with the drive gear, and means to shift the drive gear wheel to a relation that the friction band thereof engages with the friction band of the carrying wheel to cause rotary movement to be transmitted to the operating shaft.

10. A machine for blocking out or thinning plants growing in rows comprising a supporting frame, an axle extending transversely of the frame and on which the same is mounted, carrying wheels mounted on the ends of the axle, means by which draft may be applied to move the machine over a field in line with the rows of plants, an operating shaft mounted centrally of the frame in line with the direction of travel and provided with a pair of operating cranks spaced apart approximately on the quarter turn, a trailing wheel connected on the rear portion of the frame to give additional support, supporting hangers mounted flexibly on the rear portion of the frame near each end thereof, carrying members located on each side of the operating shaft in line with the cranks thereof, pilot wheels movably carried by said supporting hangers to be substantially in line with the crank arms of the operating shaft, positioning rods rigidly connected with the bearing members and connected around the operating shaft, connecting links rigidly connected with the mounting of the pilot wheels and hingedly connected with the bearing members to permit downward swinging movement of the pilot wheels with respect to the bearing members and to stop upward swinging movement thereof at a predetermined setting, a pair of slide rods connected by a connecting plate to be received in the bearings of the bearing members and to be capable of sliding movement, mounting plates carried by the slide rods, pitman rods connected to the sliding structure and with the crank arms to cause the mounting plates to be given reciprocatory movement as the operating shaft is turned, mounting bars connected with the mounting plates to extend diagonally downwardly and inwardly therefrom and provided on their inner ends with parts of a hinged joint, carrying plates hingedly connected with the mounting bars to have movement outwardly thereof limited, mounting shoes secured on the carrying plates to be adjustable in their height of disposition, hoe blades carried by the shoes, coil springs connected between the carrying plates and the mounting bars to hold the carrying plates resiliently moved to a relation that the hoe blades are presented in an operative position, a power drive gear mounted on the axle in proximity to one of the carrying wheels, friction bands mounted on the drive gear and carrying wheel, a power transmission shaft, a geared connection from the power transmission shaft to the operating shaft, a pinion on the power transmission shaft meshing with the drive gear, means to shift the drive gear wheel to a relation that the friction band thereof engages with the friction band of the carrying wheel to cause rotary movement to be transmitted to the operating shaft, a seat carried by the supporting frame, foot levers connected on the forward part of the frame on each side of the seat, bell crank operating levers carried by the supporting frame, and connections from the foot levers to these bell crank operating levers and to the bearing members so arranged that as pressure is exerted upon the foot levers, the bearing members will be raised to move the hoe blades to a disposition above the ground and out of an operative relation.

In testimony whereof I affix my signature in presence of two witnesses.

WALTER A. CARTE.

Witnesses:
 PEARLE BRINEY,
 MURRIN BOYLE.

Copies of this patent may be obtained for five cents each, by addressing the "Commissioner of Patents, Washington, D. C."